United States Patent [19]

Kurakake et al.

[11] Patent Number: 4,812,836
[45] Date of Patent: Mar. 14, 1989

[54] PICTURE PROCESSING APPARATUS

[75] Inventors: Mitsuo Kurakake; Shoichi Otsuka, both of Hino, Japan

[73] Assignee: Fanuc Ltd, Minamitsuru, Japan

[21] Appl. No.: 2,399

[22] PCT Filed: Apr. 23, 1986

[86] PCT No.: PCT/JP86/00202
§ 371 Date: Dec. 5, 1986
§ 102(e) Date: Dec. 5, 1986

[87] PCT Pub. No.: WO86/06523
PCT Pub. Date: Nov. 6, 1986

[30] Foreign Application Priority Data

Apr. 30, 1985 [JP] Japan ............................. 60-93488

[51] Int. Cl.$^4$ ............................................. G09G 1/02
[52] U.S. Cl. .................................... 340/724; 340/792; 340/798
[58] Field of Search ............... 340/723, 724, 726, 792, 340/798, 799, 800

[56] References Cited

U.S. PATENT DOCUMENTS

| 4,445,114 | 4/1984 | Stubber | 340/726 |
| 4,546,451 | 10/1985 | Bruce | 364/900 |
| 4,642,621 | 2/1987 | Memoto et al. | 340/724 |
| 4,642,790 | 2/1987 | Minshull et al. | 340/726 |

FOREIGN PATENT DOCUMENTS 57-73561 5/1982 Japan.
59-152779 8/1984 Japan.

Primary Examiner—Donald J. Yusko
Assistant Examiner—Jeffery A. Brier
Attorney, Agent, or Firm—Staas & Halsey

[57] ABSTRACT

A picture processing apparatus is provided which includes a first frame memory for storing digitalized picture information and includes SAMs (serial access memories) which are capable of reading and writing parallel data with respect to the frame memory, whereby the data are transferred to a second frame memory, following an address offset, to copy the picture information. High-speed processing for translating a picture can thus be executed.

1 Claim, 4 Drawing Sheets

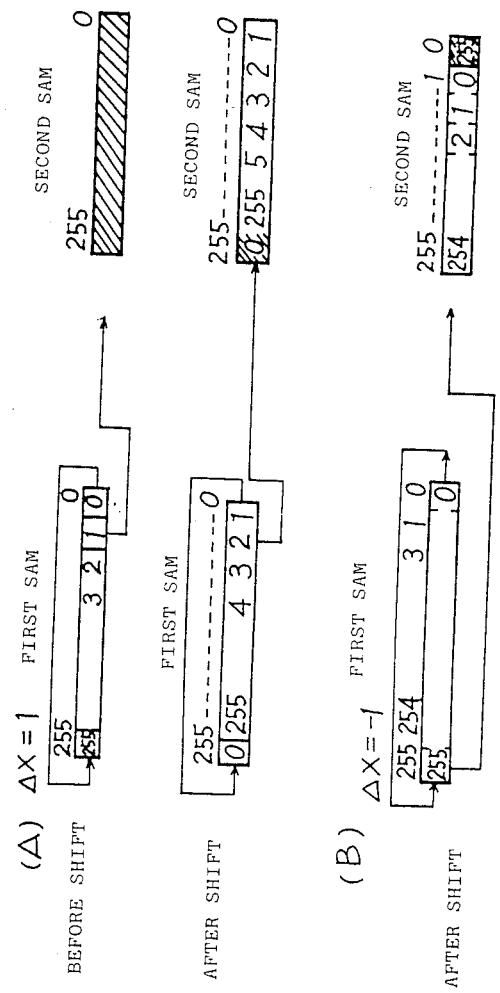

PICTURE PROCESSING APPARATUS

DESCRIPTION

This invention relates to a picture processing apparatus and, more particularly, to a picture processing apparatus for high-speed translation of a picture along the X and Y axes.

A technique which recently has come into use involves mounting a television camera at the end of an arm of an industrial robot and controlling the robot on the basis of a picture obtained from the camera. Conventionally, translation of the picture, in a picture processing apparatus of this kind, is carried out by reading the contents of a frame memory in which a source picture has been stored in advance and then performing calculations. However, since the picture processing apparatus for this purpose is composed of complicated hardware, and since the calculations are complex, processing cannot be executed at high speed.

SUMMARY OF THE INVENTION

An object of the present invention is to provide a picture processing apparatus in which picture translation processing can be carried out at high speed through a simple arrangement without using complicated hardware.

In accordance with the present invention, there is provided a picture processing apparatus for shifting a displayed picture described on a display screen to a predetermined position, the apparatus having: a first frame memory for storing one frame of a picture; a second frame memory for storing one other frame of a picture; a first SAM (serial access memory) capable of inputting and outputting a portion of picture data with respect to the first frame memory; a second SAM capable of inputting and outputting a portion of picture data with respect to the second frame memory, picture data from the first SAM being transferred to the second SAM; X- and Y-address counters for designating addresses of the first and second frame memories; and DX and DY registers for deciding an amount of an address offset when picture data are transferred from the first frame memory to the first SAM and from the first SAM to the second SAM.

In the picture processing apparatus, a control circuit applies an offset of ΔX (in the column direction) when one row of picture data is transferred from the first frame memory to the first SAM and from the first SAM to the second SAM. Accordingly, the result of movement in the column direction (along the X axis) is input to the second SAM. Next, the control circuit inputs picture data from the second SAM to the second frame memory with an offset of ΔY (in the row direction). Accordingly, the result of movement in the row direction (along the Y axis) is input to the second frame memory. Since movement in the column direction has already taken place, movement of the picture along the X and Y axes is performed.

BRIEF DESCRIPTION OF THE DRAWINGS

FIG. 5 illustrates movement of a picture in the row direction.

DETAILED DESCRIPTION OF THE PREFERRED EMBODIMENT

An embodiment of the present invention will now be described in detail with reference to the drawings.

Figure 1:
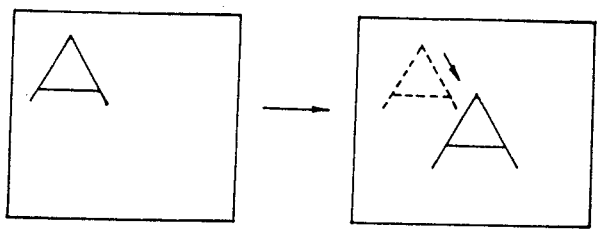
FIG. 1 is a schematic view for describing the principle of a picture processing apparatus according to the present invention.
Figure 2:
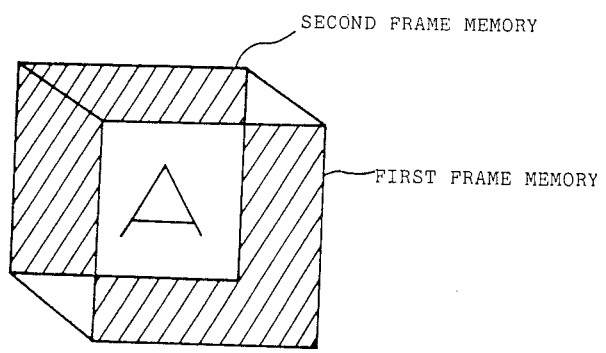
FIG. 2 is a schematic view showing the relationship between a first frame memory and a second frame memory at translation of a picture in the picture processing apparatus of the present invention.

FIG. 1 illustrates translation of a picture, e.g. movement of the character "A" from the upper left to the center. Specifically, in a picture processing apparatus, the picture stored in a first frame memory, e.g. an upper-left source picture "A", is offset by a predetermined amount along X and Y axes and the picture is stored in a second frame memory so as to occupy, e.g. an approximately central position, as shown in the right hand side of FIG. 1 and in FIG. 2.

Figure 3:
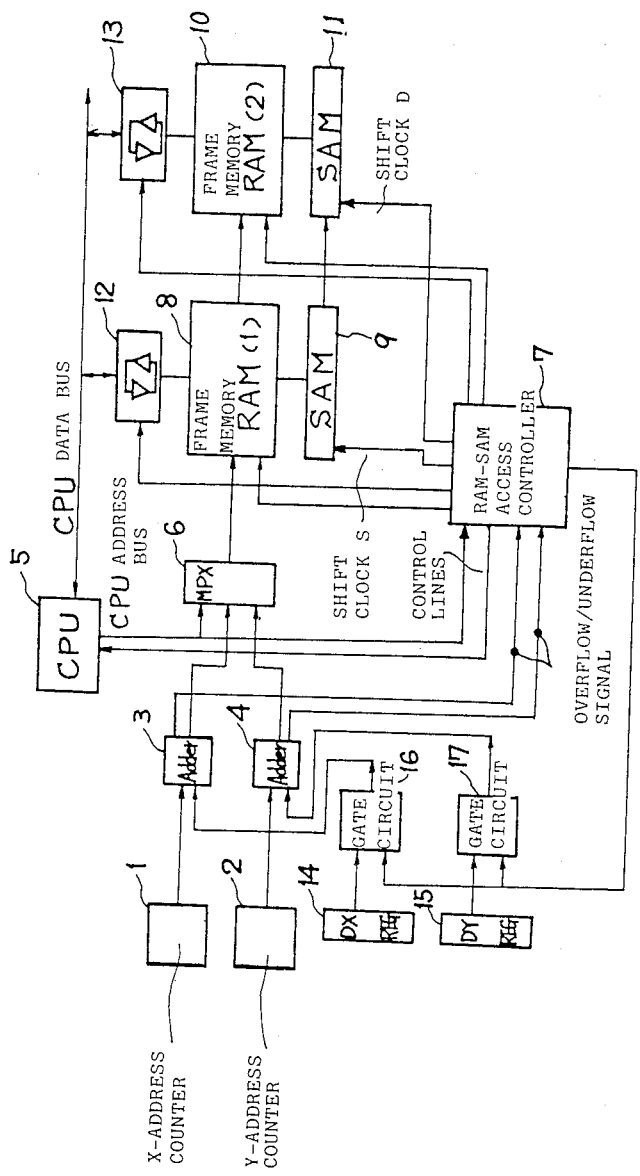
FIG. 3 is a block diagram of the picture processing apparatus of the present invention.

In FIG. 3, numerals 1 and 2 denote X- and Y-address counters, respectively, for designating X and Y addresses of a first frame memory 8 and a second frame memory 10. Numerals 3, 4 denote adders. The adder 3 adds an address signal from the X address counter 1 and an output signal from a gate circuit 16 and outputs the sum to a multiplexer 6, and at the same time outputs an overflow/underflow signal to a RAM-SAM access controller 7. Similarly, the adder 4 adds an address signal from the Y-address counter 2 and an output signal from a gate circuit 17 and outputs the sum to the multiplexer 6, and at the same time outputs an overflow/underflow signal to the RAM-SAM access controller 7. Numeral 5 denotes a CPU for controlling each part of the circuit. Numeral 6 represents the multiplexer for selecting the X and Y addresses of the first frame memory 8 and second frame memory 10, under the control of the CPU 5. Numeral 7 denotes the RAM-SAM access controller for controlling picture data read/write operations between a first frame memory 8 and a first SAM 9 and between a second frame memory 10 and a second SAM 11, and for transferring picture data from the first SAM 9 to the second SAM 11. Numeral 8 denotes the first frame memory for storing a source picture in the usual manner. Numeral 9 denotes the first SAM capable of a parallel input/output operation with the frame memory 8. Information can be read from any location, and the stored contents can be shifted at the same time as the read operation. The first SAM 9 is adapted so as to be capable of inputting and outputting one row of the picture of the first frame memory 8. In response to a shift clock S from the RAM-SAM access controller 7, the first SAM 9 transfers the picture data to the second SAM 11 from a location offset by an X-direction address designated by the contents of a DX register 14. Numeral 10 denotes the second frame memory for storing a translated picture. Numeral 11 represents the second SAM, which is similar to the first SAM 9, and adapted so as to receive the picture data from the first SAM 9 and to be capable of reading and writing the picture data relative to the second frame memory 10. Numerals 12 and 13 denote data transmitter/receivers for transferring picture data between a CPU data bus and the first frame memory 8 or second frame memory 10 under the control of the CPU 5 in the usual manner.

Numeral 14 denotes the DX register for setting an offset DX along the X axis (column direction) and outputting the offset to the gate circuit 16. Numeral 15 denotes a DY register for setting an offset DY along the Y axis (row direction) and outputting the offset to the gate circuit 17. If signals DX, DY are applied and inhibit signals are not being applied thereto, the gate circuits 16, 17 transfer the signals from the DX register 14 and DY register 15 to the adders 3, 4, respectively. If signals DX, DY are applied and the inhibit signals are being applied, the gate circuits 16, 17 inhibit the transfer.

Figure 4:
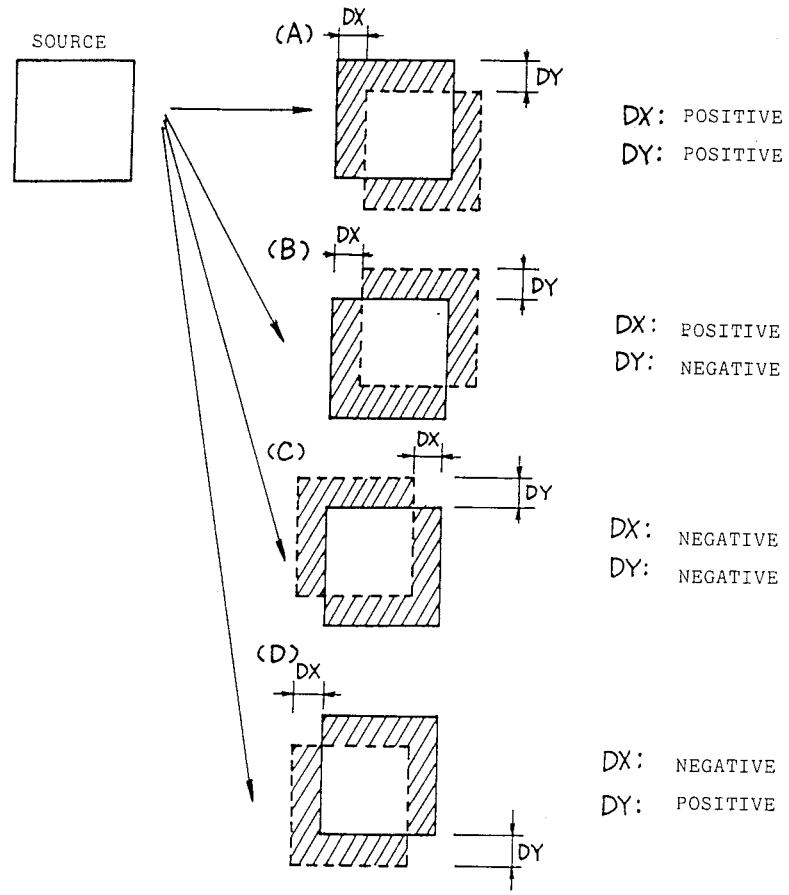
FIG. 4 is a schematic view illustrating various translations of a picture.

We will now describe a method of translating a picture by transferring picture data stored in the first frame memory 8 to the second frame memory 10 together with the address offsets DX, DY. As shown in FIGS. 4(A), (B), (C) and (D), a source picture can be moved in various directions in accordance with the DX, DY offsets and whether their sign is positive or negative. The data indicated by the oblique lines are data outside the region of the translation and can be neglected.

Next, the operation of the picture processing apparatus of the present invention will be described. The source picture is written in the first frame memory 8 under the control of the CPU 5 in the usual manner. The desired offsets DX, DY are set in the DX and DY registers, respectively. In this state, the first frame memory 8 is selected and the X-address counter 1 and Y-address counter 2 are reset to designate an address corresponding to the upper left corner. At this time the gate circuits 16, 17 are disabled so that the address signal from the Y-address counter is delivered to the multiplexer 6 through the adder 4. The multiplexer 6 successively designates Y addresses (e.g. 0–255) of the first frame memory 8. Each time this is done one row of picture data is transferred from the first frame memory 8 to the first SAM 9. The gate circuit 16 is then enabled and the offset DX is transferred via the adder 3 and multiplexer 6, so that the data stored in the first SAM 9 is delivered to the second SAM 11 after being offset by DX. At the completion of the transfer of one row of picture data from the first SAM 9 to the second SAM 11, the X-address counter 1 transmits an overflow signal via adder 3 to the RAM-SAM access controller 7 to inform of the completion of transfer.

FIG. 5(A) shows an example in which DX is taken as being $\Delta X=1$. One row of picture data input to the first SAM 9 are transferred to the second SAM 11 from a location, offset by 1. In other words, the transfer from the first SAM 9 to the second SAM 11 starts from the location of address "1", and the data being shifted in the first SAM 9 by the shift clock S are transmitted successively to the second SAM 11 from this location. As a result, data offset by $\Delta X=1$ are transferred to the second SAM 11.

Note that an underflow is generated if $\Delta X$ is negative. The underflow is neglected and a value obtained by executing binary eight-bit algebraic addition is used. For example, when $\Delta X=-1$, an address of 255 is designated, as shown in FIG. 5(B). Note that the data in the portion of the second SAM 11 indicated by the oblique lines can be neglected.

Next, the gate circuit 17 is enabled, the DY offset from the DY register 15 is added to the address from the Y-address counter 2 by the adder 4 (note that the output of the Y-address counter is 0 at this time), and the sum is transferred to the multiplexer 6. The latter designates the address of the second frame memory 10 after applying the offset of DY. In this state the picture data are transferred from the second SAM 11 to the second frame memory 10, in response to shift clock d from RAM-SAM access controller 7. One row of the picture data is transferred to the second frame memory 10 by the foregoing operations.

Thereafter, the Y-address counter 2 is successively counted upwards to transfer all of the picture data of the first frame memory 8 to the second frame memory 10.

In accordance with the picture processing apparatus of the present invention, picture translation processing can be carried out at high speed through a simple arrangement, without using complicated hardware, when shifting a display picture described on a display screen to a predetermined position. The picture processing apparatus not only can be used for picture processing in an industrial robot, such as in a case where picture information obtained from a camera eye provided at the end of a robot hand or the like is processed, but can also be employed in a drafting system using a word processor or computer.

Although a preferred embodiment has been shown and described, it should be understood that many changes and modifications may be made therein without departing from the scope of the appended claims.

What is claimed is:

1. A picture processing apparatus for shifting picture data corresponding to a picture displayed on a display screen to a predetermined position, comprising:
   (a) first frame memory means for storing one frame of picture data;
   (b) second frame memory means for storing another frame of picture data;
   (c) first SAM (serial access memory) means for receiving the picture data from said first frame memory means and for providing the picture data in accordance with a first shift clock;
   (d) second SAM means for receiving the picture data from the first SAM means and for providing the picture data in accordance with a second shift clock;
   (e) X- and Y-address counter means for designating addresses of the first and second frame memory means;
   (f) register means for storing an X offset and a Y offset; and
   (g) SAM controller means for providing the first shift clock in accordance with the X offset so that the first SAM means provides the picture data offset by an amount corresponding to the X offset, and providing the second shift clock in accordance with the Y offset so that the second SAM provides the picture data to an address of the second frame memory means offset by an amount corresponding to the Y offset.

* * * * *